United States Patent [19]

Hiraoka et al.

[11] Patent Number: 4,998,955
[45] Date of Patent: Mar. 12, 1991

[54] ASSEMBLED CAMSHAFT

[75] Inventors: Takeshi Hiraoka, Saitama; Shunsuke Takeguchi, Tochigi; Satoshi Kawai, Kuki, all of Japan

[73] Assignee: Nippon Piston Ring Co., Ltd., Tokyo, Japan

[21] Appl. No.: 349,773

[22] Filed: May 10, 1989

[30] Foreign Application Priority Data

May 23, 1988 [JP] Japan ................... 63-123799

[51] Int. Cl.$^5$ .................... F16H 53/00; B25G 3/20
[52] U.S. Cl. ................................. 74/567; 403/374
[58] Field of Search ............... 74/567; 29/432, 520, 29/525, 156.4 R; 123/90.6; 403/373, 374

[56] References Cited
FOREIGN PATENT DOCUMENTS 60-70105  4/1985  Japan ........................ 74/567
62-2242   1/1987  Japan ........................ 74/567

Primary Examiner—Vinh T. Luong
Attorney, Agent, or Firm—Birch, Stewart, Kolasch & Birch

[57] ABSTRACT

A camshaft having a steel shaft and cam pieces made from a sintering iron-base alloy material and fixed to the shaft by sintering. Prior to sintering, the green or pre-sintered cam piece is fitted on the shaft and positioned by a steel positioning pin, which is inserted both into a pin-receiving hole in the shaft and into a pin-receiving groove on the side surface of the cam piece. The positioning pin contains carbon less than the steel shaft. This results in that the carbon diffusion initiates at a predetermined position where the pin and the cam piece are in contact with each other and that the cam piece always shrinks about the position.

4 Claims, 1 Drawing Sheet

ASSEMBLED CAMSHAFT

BACKGROUND OF THE INVENTION

1. Field of the Invention

The presention invention relates to an assembled camshaft of the type having a shaft made from steel and a plurality of cam pieces made from a sintering alloy material and bonded to the shaft at predetermined positions by sintering.

2. Description of the Prior Art

The assembled camshaft has a steel shaft and cam pieces integrally fitted on the steel shaft. The cam piece is fabricated as a green cam piece from sintering alloy powders to have a shaft-receiving bore for fitting engagement with the steel shaft. The cam is then sintered to yied a liquid phase, causing the cam to shrink. When the green cam pieces is sintered to shrink, it to the shaft, has a point in the bore which first adheres to the steel shaft to define a center of shrinkage in which there is no change in axial position and to which other cross-section axially shift. The first adhering point is unexpectedly variable under treating conditions. The cam piece would get out its predetermined position unless the point is axially just in the middle of the cam piece. For example, if the point lies at the foremost end of the cam piece, the cam piece will shift forward by a length equal to the axial shrinkage of the cam piece. If the point lies at the rearmost end of the cam piece, the cam piece will shift rearward by a length equal to the axial shrinkage of the cam piece. This gives the assembled camshaft a disadvantage in that the axial position or distance from the reference plane of each cam piece is not always maintained within a desired tolerance.

It has been proposed by JP A 60-70105 to solve the aforementioned disadvantage. The camshaft comprises a metal joint inserted into a tiny clearance between the outer periphery of the steel shaft and the inner periphery of the shaft-receiving bore of the green cam piece. The metal joint has an axial length shorter than that of the shaft-receiving bore and yields a liquid phase at temperatures lower than those in which the green cam piece yields a liquid phase. The metal joint yields a liquid phase earlier than the cam piece and adheres both to the cam piece and to the shaft. This leads to the result that the center of shrinkage is regularly positioned by the joint and the camshaft has an axial dimension within a desired tolerance.

However, it takes laborious work to insert the metal joint into the tiny clearance between the inner periphery of the shaft-receiving bore of the cam piece and the outer periphery of the steel shaft, thereby increasing the manufacturing cost of the camshaft.

SUMMARY OF THE INVENTION

In view of the foregoing, it is an object of the present invention to provide an improved camshaft in which each cam piece of sintered alloy is accurately bonded at a predetermined position to a steel shaft by using no metal joint to be inserted into a tiny clearance between the cam piece and the shaft.

It is another object of the present invention to provide an improved camshaft in which it is easy to provide each cam piece with a point which first adheres to a steel shaft when sintered.

The present invention consists in a camshaft having a steel shaft, a plurality of cam pieces fitted on the shaft, a plurality of positioning pins made from steel and put radially on the outer surface of the shaft, each cam piece being fabricated as a green cam piece from sintering iron-base alloy powders and then bonded to the shaft by sintering, the green cam piece having a pin-receiving groove in which the positioning pin is fitted prior to sintering, the positioning pin containing less carbon than the steel shaft.

Sometimes, the green cam piece is pre-sintered prior to sintering. The positioning pins have their lower portions inserted into pin-receiving holes which are radially formed on the outer surface of the shaft. Each green or pre-sintered cam piece is fitted on the steel shaft in a manner that the positioning pin reachs the bottom of the pin-receiving groove in the side surface of the cam piece. Then, the assembly of the shaft and the green or pre-sintered cam pieces is sintered.

The cam pieces metallurgically bond both to the steel shaft and to the positioning pin due to diffusion by sintering. The diffusion-bonding is mostly attributable to carbon diffusing from the iron-base alloy to the steel of the shaft and the pin. The iron-base alloy initiates the carbon diffusion first to what is higher in carbon concentration gradient.

The positioning pin contains carbons less than the steel shaft and has a higher concentration gradient of carbon than the shaft. Therefore, the cam piece initiates diffusion-bonding not to the steel shaft but to the positioning pin. The initial diffusion bonding takes place at the bottom of the groove where the positioning pin is in contact with the cam piece. This means that the cam piece first adheres to the shaft at a contact line or surface between the positioning pin and the groove and that the cam piece always shrinks about the contact line or surface when sintered. The center of shrinkage, that is, the contact line or surface between the pin and the groove is exactly defined by the pin-receiving hole on the outer surface of the shaft. Therefore, once the pins are fixedly disposed on the respective holes which are accurately formed at predetermined positions on the shaft, the camshaft has cam pieces axially positioned within a desired tolerance. The axial position or distance from the reference plane of each cam piece is improved in accuracy, irrespective of the shrinkage of the sintering alloy during sintering.

The advantages offered by the presenting invention are mainly that the assembled camshaft has the cam pieces bonded to the steel shaft at predetermined positions with a high degree of accuracy and that the axial distance of each cam piece from the reference plane is always held within a desired tolerance. In the making of the inventive camshaft, the green cam piece made of sintering alloy powders is metallurgically bonded to the steel shaft by sintering. The contact portion of the steel pin with the groove in the green cam piece is always higher in carbon concentration gradient than the contact portion of the steel shaft with the shaft-receiving bore of the green cam piece, so that the cam piece first adheres to the steel pin at the contact portion, which becomes a center of shrinkage. The center of shrinkage of each cam piece is determined by an insertion of the positioning pin into the respective pin-receiving hole in the shaft. The insertion of the pin into the hole is very easy as compared with the insertion of the metal joint into the tiny clearance between the outer periphery of the shaft and the inner peripheray of the shaft-receiving bore of the green cam piece in the known camshaft. Therefore, the inventive camshaft can be manufactured at a relatively low cost without requiring skilled workers.

BRIEF DESCRIPTION OF DRAWINGS

The invention will become more fully understood from the detailed description given hereinbelow and the accompanying drawings which are given by way of illustration only, and thus are not limitative of the present invention, and wherein.

DETAILED DESCRIPTION OF THE INVENTION

The present invention is described in detail below with reference to drawings which illustrate preferred embodiments.

Figure 1:
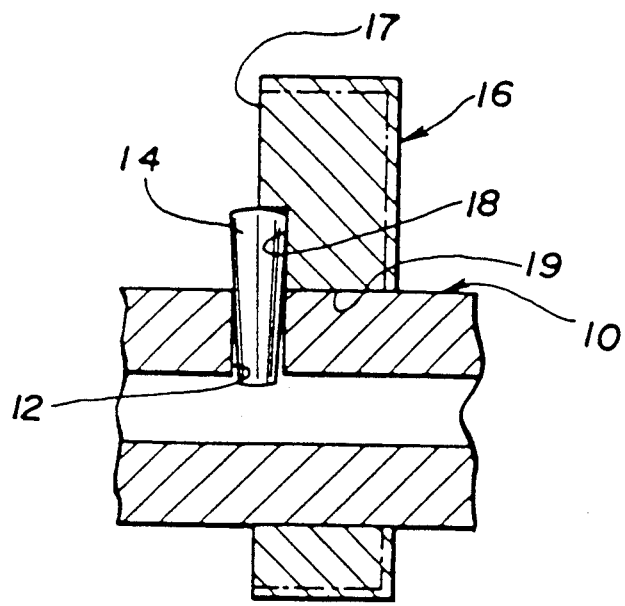
FIG. 1 is a longitudinal section of the relevant portion of the camshaft according to the present invention.

Referring now to FIG. 1, the tubular shaft 10 is made of a carbon steel pipe containing 0.45 to 0.55% by weight of carbon. The positioning pin 14 is made of a steel rod containing no more than 0.25% by weight of carbon. The cam piece 16 is made from a sintering iron-base alloy material containing 1.5 to 4.0by weight of carbon.

As seen in FIG. 1, the tubular steel shaft 10 is formed with the pin-receiving hole 12 into which the lower portion of the positioning pin 14 is inserted. The hole 12 is straight and perpendicular to the axis of the shaft 10. The pin 14 is so tapered as to make a circular contact with the hole 12, thereby being tightly held by the hole 12. Sintering alloy powders are formed into a green contact in the form of the cam piece 16 by the use of a molding die and then fitted on the shaft 10 or pre-sintered prior to being fitted on the shaft 10.

Figure 2:
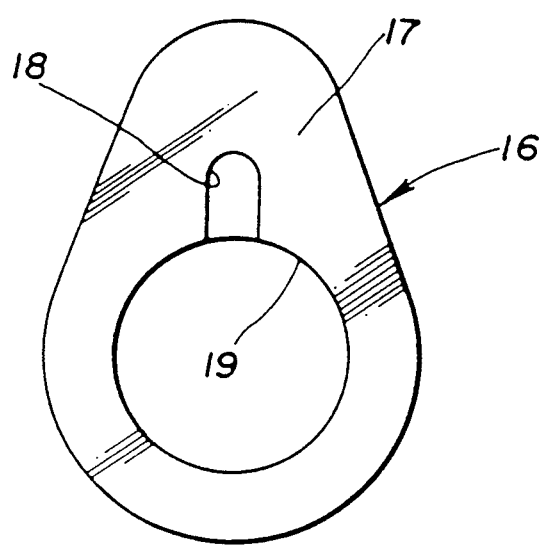
FIG. 2 is a side elevation of the cam piece of FIG. 1.

As seen in FIG. 2, the green compact 16 is formed on its side surface 17 with a pin-receiving groove 18 crossing the shaft-receiving bore 19. As seen in FIG. 1, the positioning pin 14 is also fitted in the groove 18 to determine both the axial and peripheral positions of the cam piece 16 with respect to the steel shaft 10 when the green or pre-sintered cam pieces and the steel shaft are assembled into an assembly. The assembly is treated in a sintering furnace to produce a camshaft having the cam pieces secured to the shaft.

During sintering, the positioning pin 14 makes a linear or surface contact with the bottom of the groove 18 while the shaft 10 has the outer surface thereof in contact with the inner surface of the shaft-receiving bore 19. The pin 14 has a higher carbon concentration gradient than the shaft 10 since the pin 14 contains carbon less than the shaft 10. This results in that a diffusion of carbon from the cam piece 16 initiates at a position in which the pin 14 and the cam piece 16 are contact with each other and that the bottom of the groove 18 joins with the pin 14 earlier than any other portions. The first joint becomes a center of shrinkage due to sintering. As shown by the dotted lines in FIG. 1, the cam piece 16 shrinks about the axial position of the bottom of the groove 18. Neither the amount of shrinkage of the cam piece 16 nor the gap between the shaft-receiving bore 19 and the shaft 10 affects the center of shrinkage. It is only determined by the axial position of the positioning pin 14. Therefore, when the pins are put at given positions on the shaft, the cam pieces are secured at the determined positions to the shaft, resulting in a camshaft having a dimension with a specified accuracy after being sintered.

Figure 3:
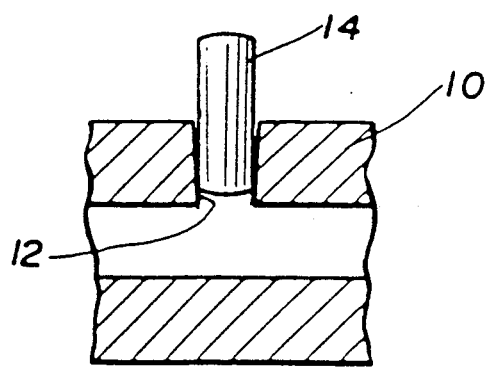
FIGS. 3 and 4 are sections of other embodiments, illustrating the positioning pin inserted into the pin-receiving hole.

As seen in FIG. 3, the steel shaft 10 can be formed with a tapered hole 12. The positioning pin 14 is straight and has a diameter slightly larger than the minimum diameter of the hole 12. Thus, the straight pin 14 is tightly held by the tapered hole 12.

Figure 4:
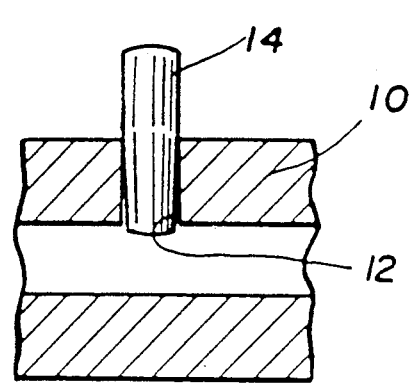

As seen in FIG. 4, the positioning pin 14 has an upper straight portion and a lower tapered portion. The upper straight portion has a diameter equal to the maximum diameter of the lower portion. The steel shaft 10 has the straight pin-receiving hole 12 of which the diameter is smaller than the maximum diameter of the lower portion and larger than the minimum diameter of the lower portion. Thus, the pin 14 has its tapered lower portion tightly inserted into the straight hole 12.

The steel shaft 10 is easily machined to have the pin-receiving hole 12 when the hole 12 is perpendicular to the axis of the shaft. It is also easy to insert the positioning pin 14 into the hole 12. Therefore, the manufacturing of the inventive camshaft needs either special tools nor skilled workers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An assembled camshaft comprising
a steel shaft, and
at least one cam piece made from a sintering iron-base alloy material and secured at predetermined positions to said shaft by sintering,
said cam piece being formed on the side surface thereof with a pin-receiving groove in which a steel positioning pin is fitted prior to being sintered and set on the outer surface of said shaft,
said pin containing no more than 0.25% by weight of carbon,
said shaft containing 0.45 to 0.55% by weight of carbon, and
said cam piece containing 1.5 to 4.0% by weight of carbon.

2. The assembled camshaft of claim 1, wherein said pin contains less carbon than said shaft.

3. The assembled camshaft of claim 1, wherein said pin contains a higher carbon concentration gradient than said shaft.

4. An assembled camshaft comprising
a steel shaft,
at least one pin-receiving holes formed in the outer surface of said shaft,
cam pieces made from a sintering alloy material and secured to said shaft by sintering,
a pin-receiving groove formed in the side surface of each of said cam pieces,
a positioning pin having a lower portion inserted into and tightly held by each of said hole and an upper portion fitted in said pin-receiving groove to define the axial and peripheral portions of said cam pieces on said shaft when said cam piece is sintered, said pin, said shaft and said cam piece containing no more than 0.25%, 0.45 to 0.55% and 1.5 to 4.0% by weight of carbon, respectively, said pin containing less carbon than said shaft.

* * * * *